United States Patent
Hsieh et al.

(10) Patent No.: US 7,583,324 B2
(45) Date of Patent: Sep. 1, 2009

(54) VIDEO DATA PROCESSING METHOD AND APPARATUS FOR PROCESSING VIDEO DATA

(75) Inventors: Ming-Jane Hsieh, Taipei (TW); Yi-Shu Chang, Hsin-Chu Hsien (TW); Te-Ming Kuo, Hsin-Chu Hsien (TW); Shi-Wei Chen, Chang-Hua (TW)

(73) Assignee: Realtek Semiconductor Corp., HsinChu (TW)

( * ) Notice: Subject to any disclaimer, the term of this patent is extended or adjusted under 35 U.S.C. 154(b) by 581 days.

(21) Appl. No.: 11/161,819

(22) Filed: Aug. 17, 2005

(65) Prior Publication Data

US 2006/0038921 A1    Feb. 23, 2006

(30) Foreign Application Priority Data

Aug. 18, 2004   (TW) .............................. 93124832 A

(51) Int. Cl.
*H04N 9/64* (2006.01)
*H04N 5/445* (2006.01)

(52) U.S. Cl. ...................... 348/716; 348/564; 348/567; 348/718

(58) Field of Classification Search ................. 348/564, 348/714, 716, 718, 565, 567, 568; 711/147–153; 345/631, 543, 541, 535; 375/240.25
See application file for complete search history.

(56) References Cited

U.S. PATENT DOCUMENTS

| | | | | |
|---|---|---|---|---|
| 5,818,434 A * | 10/1998 | Yamamoto et al. | .......... | 345/565 |
| 6,058,459 A * | 5/2000 | Owen et al. | .............. | 711/151 |
| 6,310,657 B1 * | 10/2001 | Chauvel et al. | ............ | 348/569 |
| 6,369,855 B1 * | 4/2002 | Chauvel et al. | .......... | 348/423.1 |
| 6,417,886 B1 * | 7/2002 | Tariki | ...................... | 348/384.1 |
| 6,462,744 B1 * | 10/2002 | Mochida et al. | ............. | 345/543 |
| 6,774,918 B1 * | 8/2004 | Muth | ......................... | 715/716 |
| 6,885,392 B1 * | 4/2005 | Mancuso et al. | ............. | 348/36 |
| 7,119,849 B2 * | 10/2006 | Yui et al. | ..................... | 348/564 |
| 7,129,993 B2 * | 10/2006 | Park | ........................... | 348/569 |
| 7,330,196 B2 * | 2/2008 | Ishihara | ..................... | 345/631 |
| 2002/0106025 A1 * | 8/2002 | Tsukagoshi et al. | .... | 375/240.16 |
| 2004/0190632 A1 * | 9/2004 | Cismas | .................. | 375/240.26 |

* cited by examiner

*Primary Examiner*—Victor R Kostak
(74) *Attorney, Agent, or Firm*—Winston Hsu

(57) ABSTRACT

A video processing method utilized in a video data processing device for processing video data is disclosed. The video data includes at least a first video data set, and the video data processing device has a memory and a video decoder. The method includes utilizing the video decoder to decode the video data for generating a display data set, driving the video decoder to select a specific video data set from the first video data set wherein the display data set does not have display data corresponding to the specific video data set, and utilizing the memory to store the display data.

16 Claims, 6 Drawing Sheets

US 7,583,324 B2

VIDEO DATA PROCESSING METHOD AND APPARATUS FOR PROCESSING VIDEO DATA

BACKGROUND OF THE INVENTION

1. Field of the Invention

The invention relates to a video processing method and related apparatus thereof, and more particularly, to a video processing method and related apparatus capable of saving bandwidth.

2. Description of the Prior Art

For the development and popularization of consumer electronics products, video and audio entertainment products have become a part of life, and the progressive technology variously entertains people. Taking TV for example, previously TV only received signals from broadcast TV stations, and consumers could only choose a limited number of channels. As cable TV became popular, the number of channels has increased significantly and more choices have become available. In the recent years, for better display quality, many display standards have been issued. One of the most important is the invention of digital TV. For example, a digital TV can be utilized with a multimedia computer system and has better picture quality.

A digital TV system generally utilizes a bus structure to communicate with its internal elements. Please refer to FIG. 1, which is a block diagram of a digital TV 10 according to the prior art. The digital TV 10 includes a memory 12, a front-end processor 14, a MPEG decoder 16, a display engine 17, a displayer 18, and a bus 20 to which these aforementioned elements are coupled. The memory 12 is utilized to store video data, and the memory 12 can be divided into two memory blocks 22, 24, where the memory block 22 is utilized to store un-decoded video data, and the memory block 24 is utilized to store decoded video data. The front-end processor 14 receives un-decoded video data from an antenna or other sources, performs pre-processing on received video data, and stores the processed video data in the memory block 22 of the memory 12 through the bus 20. The MPEG decoder 16 is utilized to read un-decoded video data from the memory block 22 of the memory 12, and to store the decoded display data in the memory block 24 of the memory 12 through the bus 20. Finally, the display engine 17 reads the display data from the memory block 24, and drives the displayer 18 according to the display data to display a picture corresponding to the digital TV signals received by the digital TV 10.

As data transmitted with the digital signal is generally quite large, the limited bandwidth of the bus 20 or of the memory 12 often results in a bottleneck in the system structure of a digital TV system. However, in a digital TV system, many features utilizing digital data processing, such as picture-in-picture (PIP) and on-screen display (OSD), often generate overlapping pictures. For example, a sub-picture covers a part of a main picture or an OSD area covers a video picture, so a part of the processed and decoded video data is not shown in the displayer 18 because it has been covered. In the above-mentioned situation, the bandwidth corresponding to the covered area is wasted because the video data corresponding to the covered area uses considerable bandwidth during decoding and processing but the data is not shown in the displayer 18.

SUMMARY OF THE INVENTION

It is therefore a primary objective of the claimed invention to provide a video processing method and related apparatus for saving bandwidth of a bus or memory, to solve the above-mentioned problem.

According to a preferred embodiment of the claimed invention, a video data processing apparatus for processing a video data is disclosed, the video data comprising a first video data set for driving a displayer to display a first picture, and the video data processing apparatus comprising: a video decoder for decoding the video data to generate and output a display data set, wherein the video decoder selects a specific video data set out of the first video data set according to a display area of the displayer, and the display data set does not comprise display data corresponding to the specific data set; and a memory coupled to the video decoder for storing the display data set outputted by the video decoder.

Furthermore, a method of processing a video data is disclosed, the video data comprising a first video data set for driving a displayer to display a first picture, and the method comprising: selecting a specific video data set out of the first video data set according to a display area of the displayer; utilizing a video decoder to decode the video data to generate and output a display data set, wherein the display data set does not comprise display data corresponding to the specific data set; and utilizing a memory to store the display data set outputted by the video decoder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
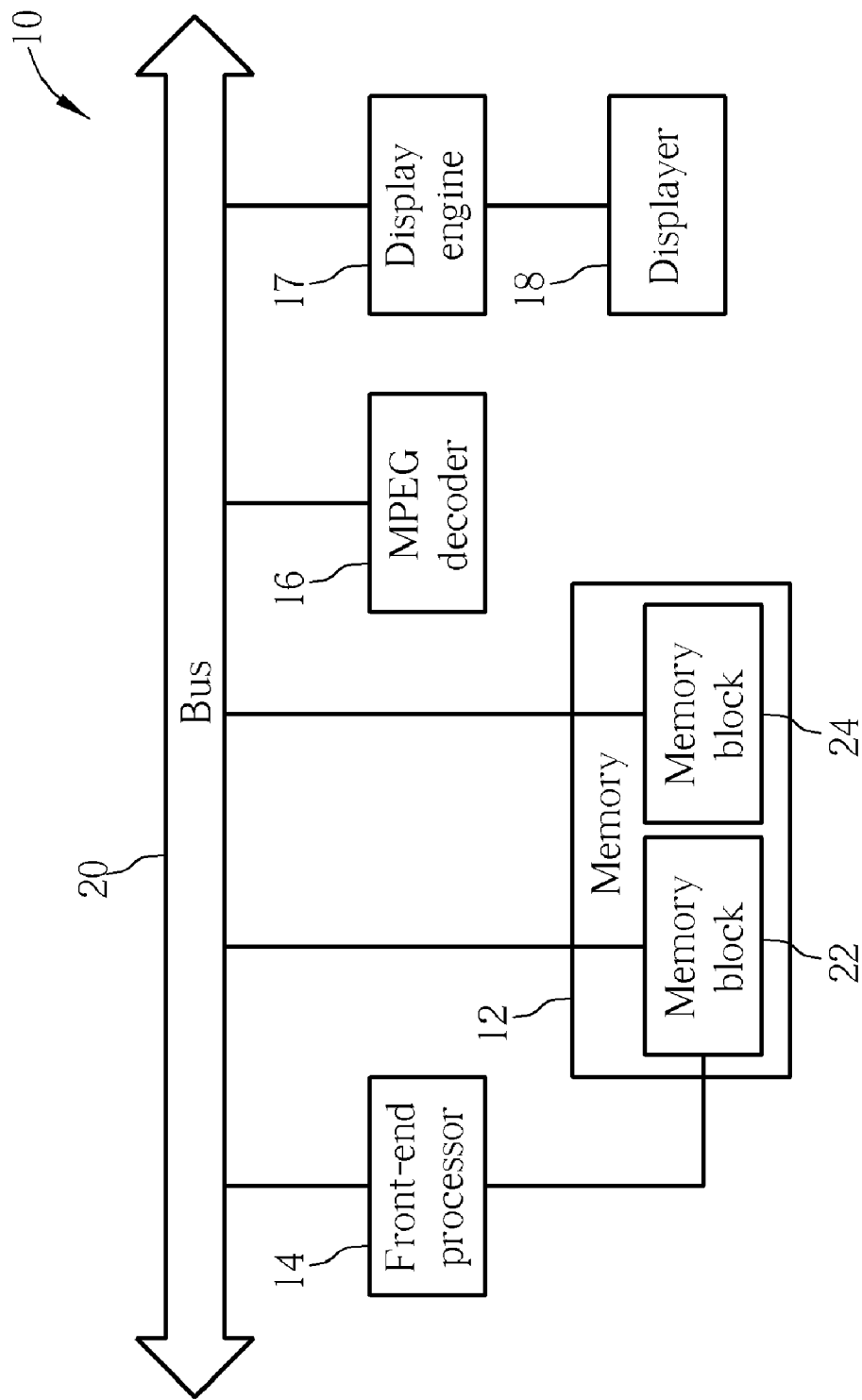
FIG. 1 is a block diagram of a digital TV according to the prior art.
Figure 2:
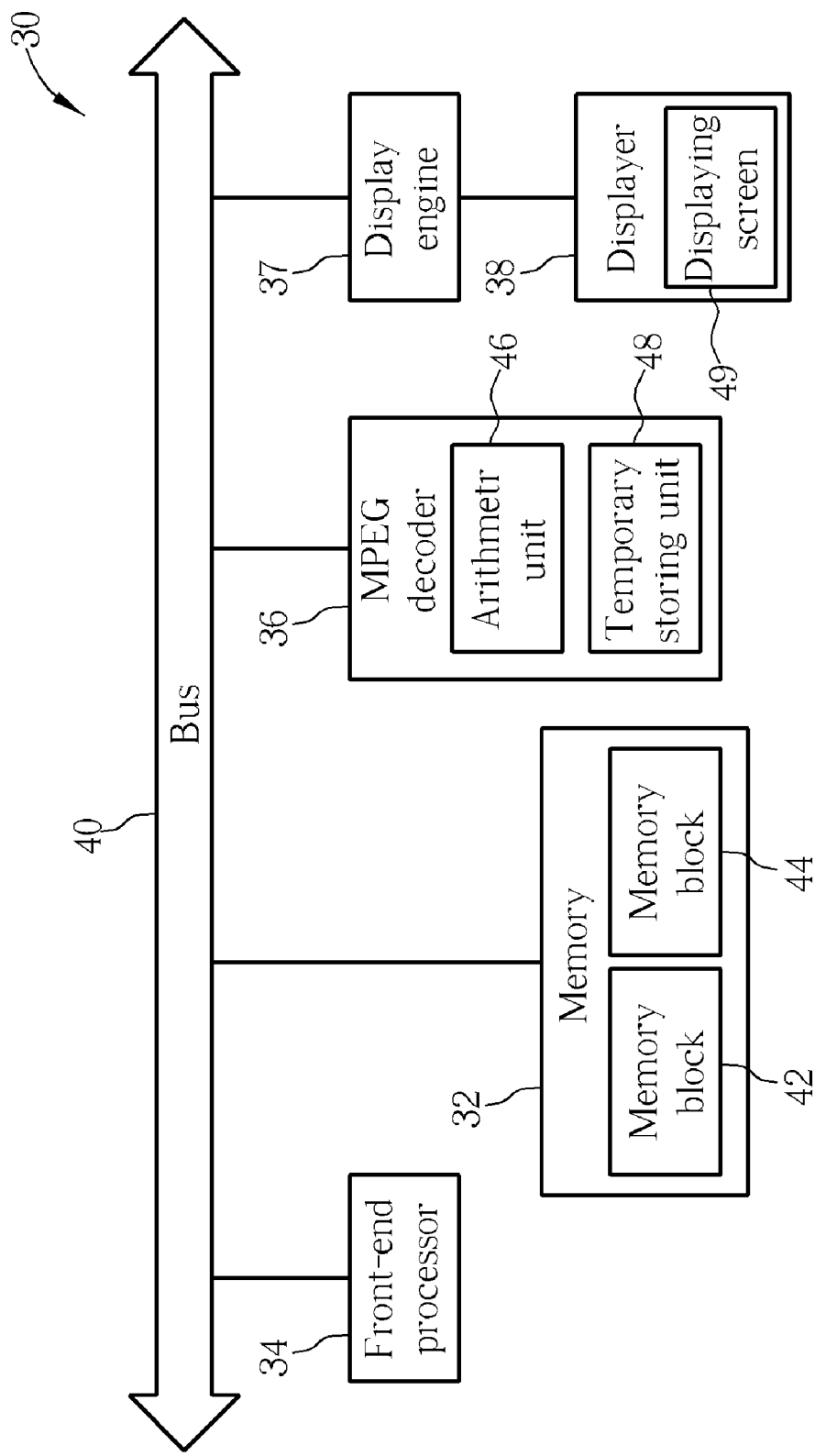
FIG. 2 is a block diagram of a digital TV according to the present invention.

Please refer to FIG. 2, which is a block diagram of a digital TV 30 according to the present invention. The digital TV 30 comprises a memory 32, a front-end processor 34, a MPEG decoder 36, a display engine 37, a displayer 38, and a bus 40. The memory 32 is used for storing video data, and the memory 32 can be conceptually divided into two memory blocks 42, 44, where the memory block 42 is used for storing un-decoded video data, and the memory block 44 is used for storing decoded video data. For example, the memory block 44 may be a frame buffer for storing all of the display data for all pixels in a frame. The front-end processor 34 is used for receiving un-decoded video data from an antenna or other sources and to pre-processes the received video data set such as by performing a demux operation on the received video data set and storing the pre-processed video data set in the memory block 42 of the memory 32 through the bus 20. The MPEG decoder 36 is used for reading the un-decoded video data set from the memory block 42 of the memory 32, for decoding the un-decoded video data set, and for outputting a display data set back into the memory block 44 of the memory 32 through the bus 40. Finally, the display engine 37 reads the display data set from the memory block 44 and drives the displayer 38 to display a picture corresponding to the received digital TV signal of the digital TV 30 on a displaying screen 49. Please note that for this embodiment, the decoder 36 conforms to a MPEG standard, such as MPEG2 or MPEG4, however, those skilled in the art can understand that the decoder 36 can also utilize other encoding/decoding techniques.

In this embodiment, when the MPEG decoder 36 reads a specific video data set from the memory block 42 of the memory 32 to decode the specific video data. The MPEG decoder 36 can select a partial video data set according to the way the specific video data finally will be displayed on the displaying screen 49, and furthermore, the MPEG decoder 36 does not store the display data corresponding to the partial video data set back into the memory block 44 of the memory 32. For example, when the above-mentioned display data set corresponding to the partial video data set is not shown on the displaying screen because it is covered by an overlay, whether the memory block 44 stores the display data corresponding to the partial video data set or not does not affect the display. Therefore, the MPEG decoder 36 does not store the display data corresponding to the partial video data set back into the memory 32 through the bus 40 after processing the display data corresponding to the partial video data set, or the MPEG decoder does not process the partial video data set.

For performing the above-mentioned function, as shown in FIG. 2, the present invention MPEG decoder 36 has an arithmetic unit 46 and a temporary storing unit 48. The arithmetic unit 46 determines the display area corresponding to the partial video data set according to the result of the video data displayed on the displayer 38 (such as PIP or OSD), and temporarily stores display coordinates corresponding to the display area on the displaying screen 49 in the temporary storing unit 48. Then, the MPEG decoder 36 utilizes the display coordinates stored in the temporary unit 48 to determine the display data set, which corresponds to the display area and is not stored back into the memory.

Figure 3:
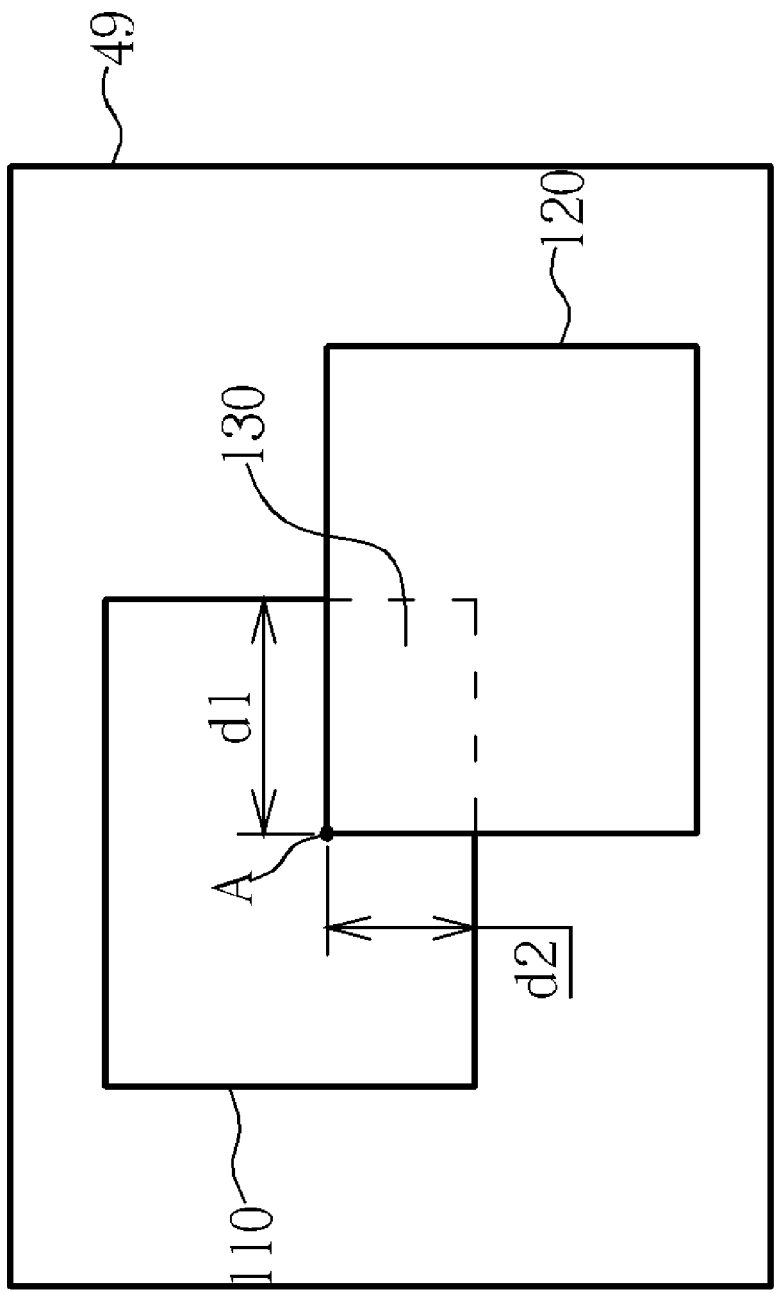
FIG. 3 is an illustration of an embodiment of the MPEG decoder shown in FIG. 2 processing video data set.

Please refer to FIG. 2 in conjunction with FIG. 3, where FIG. 3 is an illustration of an embodiment of a MPEG decoder 36 shown in FIG. 2 processing a video data set. As shown in FIG. 3, assuming that two pictures 110, 120 will be shown on the displaying screen 49 of the displayer, wherein two pictures 110, 120 partially overlap each other in a display area 130 on the displaying screen 49, and the picture 120 partially covers the picture 110 in the display area 130. For example, the picture 120 is used for displaying a subtitle or an OSD picture. The picture 110 does not show its display area 130, therefore, the MPEG decoder 36 in this embodiment does not store the display data set corresponding to the display area 130 of the picture 110 back into the memory block 44, and therefore the bandwidth used for transmitting the above-mentioned display data set corresponding to the display area 130 to the memory block 44 is saved. For example, when the MPEG decoder 36 processes the video data set corresponding to the picture 110, the arithmetic unit 46 stores the display coordinates of the display area 130 in the temporary unit 48. As shown in FIG. 3, pixel A is at a corner of the display area 130 and pixel A has a horizontal display coordinate X and a vertical display coordinate Y on the displaying screen. The size of the display area 130 is $d_1$ pixels horizontally and $d_2$ pixels vertically so that the arithmetic unit 46 stores the horizontal display coordinate X, the vertical display coordinate Y, the horizontal distance $d_1$, and the vertical distance $d_2$ in the temporary storing unit 48. Therefore, the display area 130 can be defined by the horizontal display coordinate X, the vertical display coordinate Y, the horizontal distance $d_1$, and the vertical distance $d_2$. In this embodiment, the MPEG decoder 36 decodes the video data set corresponding to the picture 110 to generate the corresponding display data set. However, when the MPEG decoder 36 transmits the display data set to the memory block 44 through the bus 40, the display data set outputted by the MPEG decoder 36 does not include the display data corresponding to the covered display area 130 as defined by the display coordinates stored in the temporary storing unit 48.

Figure 4:
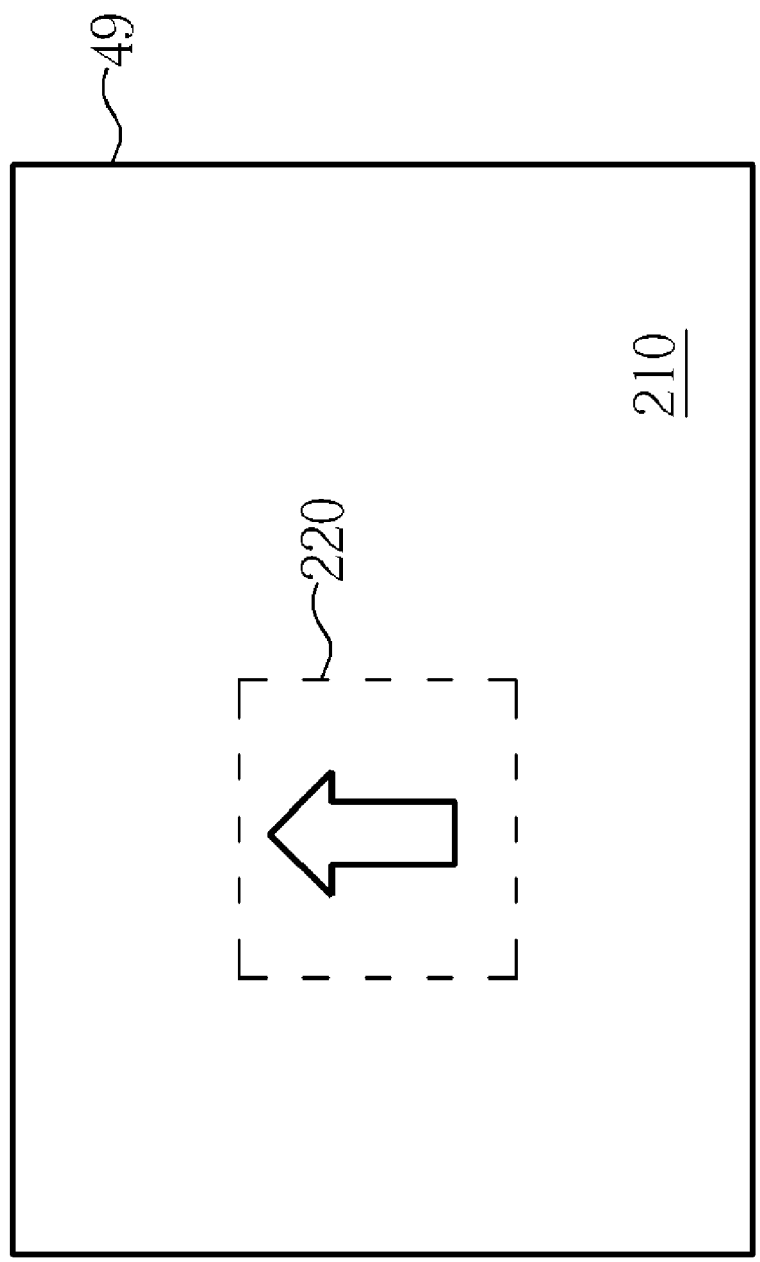
FIG. 4 and FIG. 5 are illustrations of another embodiment of the MPEG decoder shown in FIG. 2 processing video data set.
Figure 5:
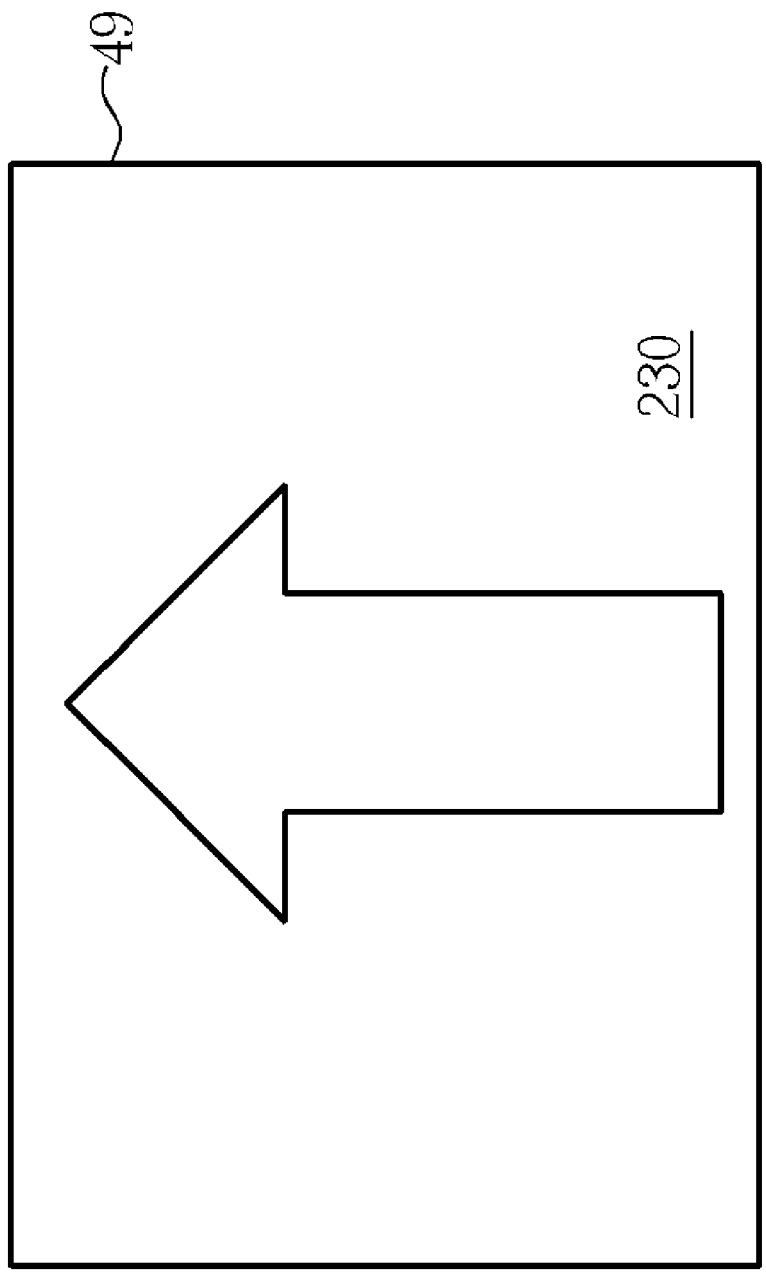

Please refer to FIG. 2 in conjunction with FIG. 4 and FIG. 5, where FIG. 4 and FIG. 5 are illustrations of another embodiment of the MPEG decoder 36 shown in FIG. 2 processing a video data set. As shown in FIG. 4, the displaying screen 49 of the displayer 38 shows a picture 210, wherein a close-up area 220 surrounded by a dotted line is selected by a user. When the display screen 49 displays the selected close-up area 220, as shown in FIG. 5, the display screen 49 only shows a scaled up picture 230 of the close-up area 220. As the displaying screen 49 in FIG. 5 only shows the close-up area 220 surrounded by the dotted lime in FIG. 4, when the display engine 37 drives the displayer 38 to show the picture 230 shown in FIG. 5 on the displaying screen, the display engine 37 only needs the display data set of the selected close-up area 220 of the picture 210. As known by those skilled in the art, the display engine 37 includes a scaler, which can perform interpolation arithmetic to create the display data set corresponding to the picture 230 from the display data set corresponding to the close-up area 220. Therefore, when the MPEG decoder 36 processes the video data set corresponding to the picture 230, the arithmetic unit 46 determines display coordinates corresponding to the area of the close-up area 220 and stores the display coordinates in the temporary storing unit 48. In this embodiment, after the MPEG decoder 36 decodes the video data set corresponding to the picture 210, the MPEG decoder 36 only transmits the necessary display data set for the picture 230, which is the display data set corresponding to the close-up area 220 of the picture 210, to the memory block 44 through the bus 40. In other words, as areas outside the close-up area 220 of the picture 210 are not shown in the picture 230, the display data set outputted by the MPEG decoder 36 does not includes the display data set corresponding to the areas outside the close-up area 220 according to the stored display coordinates.

Figure 6:
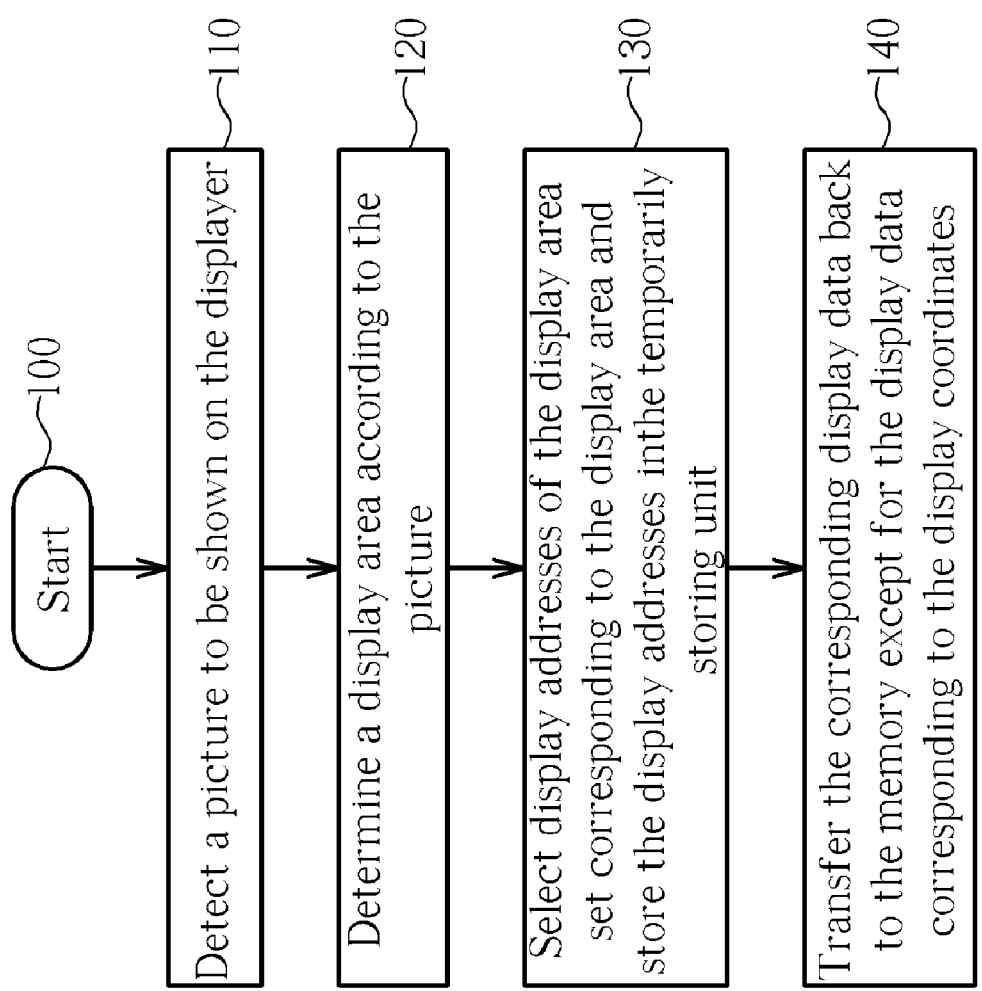
FIG. 6 is a flow chart of an embodiment of the present invention processing a video data set.

Refer to FIG. 2 in conjunction with FIG. 6, where FIG. 6 is a flow chart of an embodiment of the present invention processing a video data set. The operation by which the MPEG decoder 36 processes the video data includes the following steps:

Step 100: Start;

Step 110: The arithmetic unit 46 detects a picture to be shown on the displayer 38;

Step 120: The arithmetic unit 46 determines a display area according to the picture;

Step 130: The arithmetic unit 46 selects display coordinates of the display data set corresponding to the display area and stores the display coordinates in the temporary storing unit 48; and Step 140: The MPEG decoder 36 transmits the corresponding display data back to the memory block 44 of the memory 32 except for the display data corresponding to the display coordinates stored in the temporary storing unit 48.

Please note that in a real implementation, the arithmetic unit 46 and the temporary storing unit 48 can be included within the MPEG decoder 36, or the arithmetic unit 46 and the temporary storing unit 48 can also be electrically connected to the MPEG decoder 36 externally. Furthermore, in this embodiment, the MPEG decoder 36 determines whether the display data is not transmitted back to memory 36 according to the display coordinates of the selected display area stored in the temporary storing unit 48. However, in practice, all mechanisms capable of determining which display data set does not need to be transmitted can be utilized in this invention, meaning that the present invention is not limited to utilizing the display coordinates stored in the temporary storing unit 48. For example, the present invention can utilize the header information from a MPEG video data set to determine which video data does not need to be transmitted.

In addition, in the embodiment shown in FIG. 3, the selected display area is the overlapping area 130. A subset of the overlapping area 130 can also be the display area. In other words, the display data that does not need to be transmitted may only be a part of the display data corresponding to the display area. Similarly, in the embodiment shown in FIG. 4 and FIG. 5, the selected display area is the whole picture except for the close-up area 220, but a subset of the whole picture except for the close-up area 220 can also be selected. In other words, the video data which is not necessarily to be transmitted may only be a part of the display corresponding to the picture except for the close-up area 220, but not necessarily be the whole display data corresponding to the picture outside the close-up area 220.

Furthermore, according to the MPEG standard, video data is being transmitted by macroblocks, wherein each macroblock includes a plurality of pixels (such as 8*8 pixels). If the boundary of the overlapping area lies inside a plurality of macroblocks, the selected display area has to be smaller than the overlapping area 130 to prevent from losing information stored in the macroblocks on the boundary. Similarly, in the embodiment shown in FIG. 4 and FIG. 5, if the boundary of the close-up area 220 lies within a plurality of macroblocks, the selected display area must be smaller than the picture outside the close-up area to prevent from losing information stored in the macroblocks on the boundary.

In addition, in this embodiment, for the limitation of the MPEG standard, only a specific video picture can be chosen to save bandwidth, meaning of avoiding transmitting unnecessary display data. For example, the MPEG standard has three kinds of encoded pictures: intra-coded picture, predictive-coded picture, and bi-directionally predictive-coded picture. In this embodiment, only the bi-directionally predictive-coded picture does not have to be transmitted to save bandwidth to avoid affecting decoding operations on the other frames. Whether the other kinds of encoded pictures, such as the intra-coded picture and the predictive-coded picture, have to be transmitted or not is determined on a case-by-case basis. The present invention apparatus and method can be embodied in a digital TV, as well as in a DVD video player, a set top box, or a video switch.

In contrast to the prior art, the present invention saves a large amount of bandwidth because of picture overlapping or a close-up picture so that a large amount of bandwidth is freed, and makes the video data processing smoother. Furthermore, the present invention video data processing method and apparatus need little hardware, thus saving bandwidth while reducing cost and without significantly design complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video data processing apparatus for processing video data, the video data comprising a first video data set for driving a displayer to display a first picture, and the video data processing apparatus comprising:
   a memory, comprising a first memory block and a second memory block, wherein the first memory block stores the first video data set;
   a video decoder, coupled to the memory, for decoding the video data from the first memory block to generate and output a display data set, wherein the video decoder selects a specific video data set out of the first video data set stored in the first memory block according to a display area of the displayer, and the display data set does not comprise display data corresponding to the specific data set; and
   wherein the display data set outputted by the video decoder is stored in the second memory block of the memory.

2. The apparatus of claim 1, wherein the video data further comprises a second video data set for driving the displayer to display a second picture, and when the first picture and the second picture partially overlap in an overlapping area, the video decoder determines the display area according to the overlapping area.

3. The apparatus of claim 2, wherein the display area is a subset of the overlapping area.

4. The apparatus of claim 2, wherein the first picture is a main-picture and the second picture is a sub-picture.

5. The apparatus of claim 1, wherein the display area is a subtitle.

6. The apparatus of claim 1, wherein the display area is an OSD area where an OSD picture overlaps the first picture.

7. The apparatus of claim 1, wherein the video decoder is a MPEG decoder.

8. The apparatus of claim 7, wherein the video data conforms to a MPEG standard, and the first video data set is a bi-directionally predictive-coded picture conforming to the MPEG standard.

9. A method for processing a video data, the video data comprising a first video data set for driving a displayer to display a first picture, the method comprising:
   utilizing a memory to store the video data set into a first memory block of the memory;
   selecting a specific video data set out of the first video data set stored in the first memory block according to a display area of the displayer;
   utilizing a video decoder to decode the video data from the first memory block to generate and output a display data set, wherein the display data set does not comprise display data corresponding to the specific data set; and
   utilizing the memory to store the display data set outputted by the video decoder into a second memory block of the memory.

10. The method of claim 9, wherein the video data further comprises a second video data set for driving the displayer to display a second picture, and when the first picture and the second picture partially overlap in an overlapping area, the method further comprises:
   determining the display area according to the overlapping area.

11. The method of claim 10, wherein the display area is a subset of the overlapping area.

12. The method of claim 10, wherein the first picture is a main-picture, and the second picture is a sub-picture.

13. The method of claim 10, wherein the display area is a subtitle.

14. The method of claim 10, wherein the display area is an OSD area where an OSD picture overlaps the first picture.

15. The method of claim 9, wherein the video decoder is a MPEG decoder.

16. The method of claim 9, wherein the video data conforms to a MPEG standard, and the first video data set conforms to a bi-directionally predictive-coded picture conforming to the MPEG standard.

* * * * *